(12) United States Patent
Sheets et al.

(10) Patent No.: US 8,042,877 B1
(45) Date of Patent: Oct. 25, 2011

(54) DROP SHAFT

(75) Inventors: Elton C. Sheets, Britt, IA (US); Scott R. McMahon, Clear Lake, IA (US); Matthew Wendell Schroeder, Ventura, IA (US)

(73) Assignee: Stellar Industries, Inc., Garner, IA (US)

( * ) Notice: Subject to any disclaimer, the term of this patent is extended or adjusted under 35 U.S.C. 154(b) by 280 days.

(21) Appl. No.: 12/462,633

(22) Filed: Aug. 6, 2009

(51) Int. Cl.
*B60P 1/00* (2006.01)

(52) U.S. Cl. ....................................... 298/22 P
(58) Field of Classification Search ................... 298/1 A, 298/17 R, 17.5, 17.8, 22 R, 22 P, 17 T; 414/697, 414/718, 639
See application file for complete search history.

(56) References Cited

U.S. PATENT DOCUMENTS

| | | | |
|---|---|---|---|
| 2,034,544 A | 3/1936 | Wood | |
| 2,617,684 A | 11/1952 | Workman et al. | |
| 2,640,725 A | 6/1953 | Dale | |
| 2,731,293 A | 1/1956 | Hutchinson | |
| 2,963,185 A | 12/1960 | Jones et al. | |
| 4,067,470 A | 1/1978 | Felburn | |
| 4,488,756 A | 12/1984 | Dalman | |
| 4,645,405 A | 2/1987 | Cambiano | |
| 5,088,875 A | 2/1992 | Galbreath et al. | |
| 5,836,657 A | 11/1998 | Tilley et al. | |
| 6,142,576 A | 11/2000 | Brooks et al. | |
| 6,206,476 B1 | 3/2001 | Welton | |
| 6,409,275 B1 | 6/2002 | Gerding | |
| 6,505,891 B1 | 1/2003 | Hickey et al. | |
| 2005/0017568 A1* | 1/2005 | Ahlberg | 298/22 P |

* cited by examiner

*Primary Examiner* — Stephen Gordon
(74) *Attorney, Agent, or Firm* — BrownWinick Law Firm

(57) ABSTRACT

An apparatus for attaching hydraulic cylinders to a vehicle chassis. A plurality of vertical, parallel, spaced apart plates having first apertures through which stub shaft pins are disposed for attaching hydraulic cylinders, and second apertures below the first apertures through which a separate, tubular shaft is disposed. The stub shaft pins may be removed and replaced without removing the rest of the assembly or the tubular shaft from the apparatus or the vehicle.

8 Claims, 3 Drawing Sheets

DROP SHAFT

CROSS-REFERENCE TO RELATED APPLICATIONS

None

BACKGROUND OF THE INVENTION

1. Field of the Invention

The present invention relates generally to an apparatus for securing equipment to a vehicle chassis. Specifically, the invention relates to an apparatus for attaching lifting equipment and hoists that utilize hydraulic cylinders to a truck chassis.

2. Description of the Prior Art

Hoists and lifts mounted to the frames of vehicles are well known in the art. Also well known are methods and apparatuses for attaching hydraulic cylinders associated with hoists, lifts and the like to a truck frame. Stub shaft pins and bent shafts are typically disposed within corresponding apertures in a pair of vertical plates, the vertical plates being welded to downward-depending mounting plates that hang over a vehicle chassis. Hydraulic-cylinders are then attached to the pins and are retained with a cap. The shaft is bent, usually in a vee, to provide sufficient clearance for a drive shaft and other related vehicle components. In this common arrangement, the pins are subject to single shear. Replacement of one or both pins is labor intensive and requires torching, cutting and re-welding the entire apparatus to the chassis. The shaft may be replaced, but it typically does not wear at the same rate as the pins and may not actually need replacement at the same time. Therefore, replacement of this shaft either occurs before it is necessary or requires a separate set of tasks. In both cases representing inefficiency. Further, the "V" shape of the shaft creates a weak area in the shaft.

A need exists for an improved apparatus that permits more economical and convenient replacement of one or both stub shaft pins, without resort to welding, torching or cutting.

A further need exists for an improved apparatus that reduces cantilever bending; a further need exists to remove the weakness inherent in a bent shaft.

Yet a further need exists for an improved apparatus that provides an aspect that protects hydraulic hoses.

Finally, a need exists for an improved apparatus that allows simple replacement and securing of one shaft.

SUMMARY OF THE INVENTION

The present invention relates to an apparatus for attaching hydraulic cylinders to a vehicle chassis. The apparatus includes a plurality of vertical, parallel, spaced apart plates having first generally coaxial apertures through which stub shaft pins are disposed for attaching hydraulic cylinders, and second generally coaxial apertures below the first apertures through which a separate, tubular shaft is disposed. The stub shaft pins are secured in such a way that each may be removed and replaced without removing the rest of the assembly or the tubular shaft from the apparatus or the vehicle. Further, the stub shaft pins are secured in a double-shear relationship between two plates providing a better secured position. The separate tubular shaft does not include any bends thereby avoiding any weakened points and its interior is preferably clear of obstruction thereby allowing hydraulic hoses to be threaded therethrough and protected.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

DETAILED DESCRIPTION OF THE PREFERRED AND OTHER EMBODIMENTS

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

Figure 1:
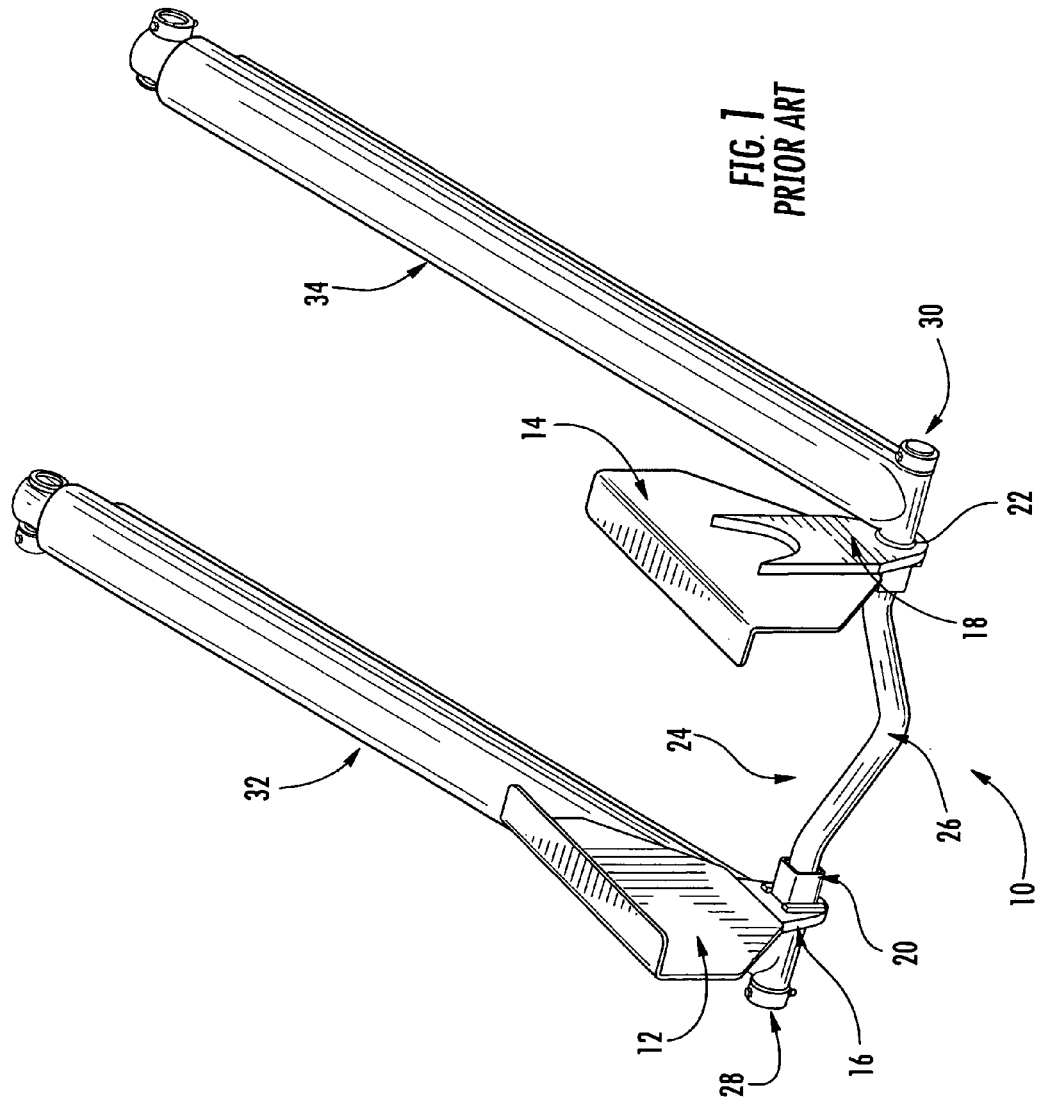
FIG. 1 is a perspective view of a prior art apparatus.

In FIG. 1, prior art apparatus 10 is depicted. Downward-depending mounting plates 12, 14 hang over a vehicle chassis (not shown). Attached to mounting plates 12, 14, typically by welding, are vertical plates 16, 18. Each plate 16, 18 has an aperture 20, 22, through which a shaft 24 is disposed, linking the plates. Shaft 24 has a bend 26 so as to accommodate the drive shaft and related components of the vehicle (not shown). Bend 26 is typically in the shape of a "V", but other configurations may be employed. Opposite ends of shaft 24 are fitted with a cap 28, 30. Secured between cap 28, 30 and vertical plates 16, 18 are bottom ends of hydraulic cylinders 32, 34.

Ends of shaft 24 comprise stub shaft pins. Persons skilled in the art will recognize that these pins are subject to a single shear by the respective cylinder 32, 34. Weakened pins, such as may result from ordinary use or welding, are also subject to breakage and may cause a cylinder to fall. It will further be appreciated that as one or both ends of shaft 24 wear and require replacement, the entire shaft 24 will need to be replaced, thereby necessitating at a minimum the separation of vertical plates 16, 18 from mounting plates 12, 14.

Figure 2:
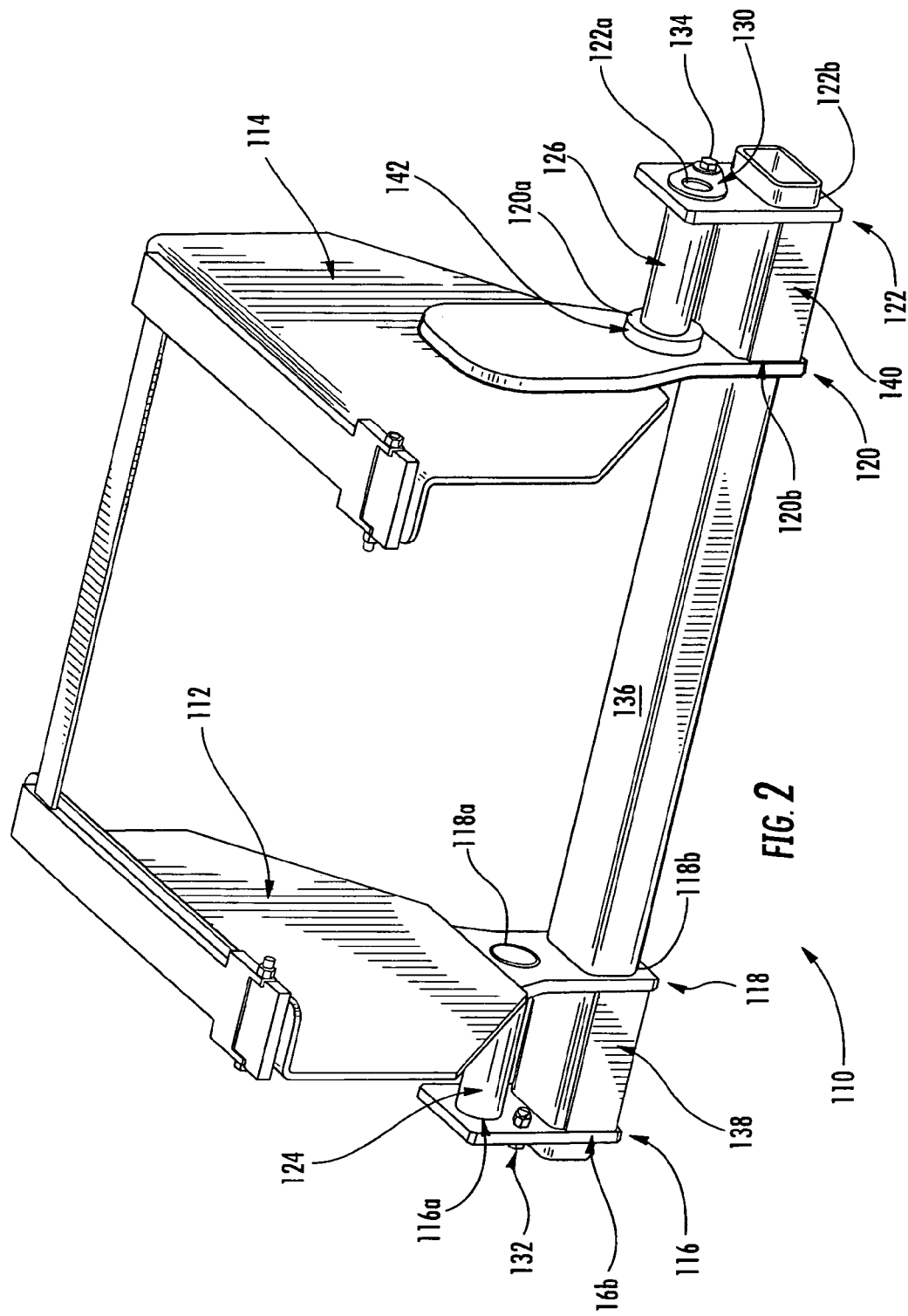
FIG. 2 is a perspective view of an embodiment of the present disclosure.

Turning to FIG. 2, an embodiment of the present disclosure is shown. Apparatus 110 directly engages a conventional pair of downward-projecting mounting plates 112, 114 which hang over a vehicle chassis (not shown) in a manner that is well known in the art. Apparatus 110 comprises four spaced apart, vertical plates that are substantially in parallel with one another. For reference purposes, these plates are—from left to right—first plate 116, second plate 118, third plate 120 and fourth plate 122. In a preferred embodiment, first and fourth plates 116, 122 are symmetric, and second and third plates 118, 120 are also symmetric. As can be seen in FIG. 2, first and fourth plates 116, 122 comprise an outer pair relative to second and third plates 118, 120, while second and third plates 118, 120 comprise an inner pair relative to first and fourth plates 116, 122. In a preferred embodiment, first and fourth plates 116, 122 are rectangular, while second and third plates 118, 120 are oblong.

Second and third plates 118, 120 are secured to mounting plates 112, 114, respectively, preferably via welding. As illustrated, plates 118, 120 are secured at their respectively facing surfaces to opposing surfaces of mounting plates 112, 114, but any relative orientation of plates 118, 120 about mounting plates 112, 114 may be utilized.

Each plate 116, 118, 120, 122 has a first aperture 116a, 118a, 120a, 122a (collectively "first apertures"), and a second aperture 116b, 118b, 120b, 122b (collectively, "second apertures"). Relative to plates 116, 118, 120, 122, first apertures generally coaxially correspond with one another, and second apertures generally coaxially correspond with one another. Also, relative to the vertical orientation of plates 116, 118, 120, 122, second apertures are situated below first apertures. First apertures are preferably symmetric and roughly identical in size and shape. Likewise, second apertures are preferably symmetric and roughly identical in size and shape and generally coaxial or generally aligned with each other horizontally. First and second apertures need not be the same size or shape relative to each other.

Disposed within first apertures 116a, 118a of plates 116, 118 is a first pin 124. Similarly, disposed within first apertures 120a, 122a of plates 120, 122 is a second pin 126. First and second pins 124, 126 comprise—and may be referred to as—stub shaft pins. First and second pins 124, 126 are preferably substantially coaxial.

On the surface of plate 116 opposite plate 118, and proximate first aperture 116a, is end plate 128. On the surface of plate 122 opposite plate 120 (and thus, opposite end plate 128), is end plate 130. End plates 128, 130 are preferably pivotably secured to plates 116, 122, respectively, with a bolt 132, 134, such that end plate 128 may be pivoted about bolt 132 to cover at least a portion of first aperture 116a, and such that end plate 130 may be pivoted about bolt 134 to cover at least a portion of first aperture 122a. It will be appreciated that when pins 124, 126 are disposed within the respective first apertures, and when end plates 128, 130 cover at least a portion thereof, that pins 124, 126 are secured between their respective plates. End plates 128, 130 are preferably teardrop in shape, with the narrower end of the teardrop proximate bolt 132, 134, respectively.

Disposed within second apertures is tubular shaft 136, which passes through each of the four plates 116, 118, 120, 122 and preferably beneath the vehicle chassis. Tubular shaft 136 is preferably hollow and rectangular in cross-section, and preferably extends slightly past plates 116, 122 at its outer ends. Importantly, tubular shaft 136 does not double as a stub shaft pin. Moreover, because tubular shaft 136 is 'dropped', e.g., entirely beneath the axis of pins 124, 126, it may be straight or substantially straight, and no formed bend or "vee" is needed to accommodate a drive shaft, thereby lending additional structural integrity and durability to assembly 110.

First and second plates 116, 118 are joined at their lower ends by bracket 138. Similarly, third and fourth plates 120, 122 are joined at their lower ends by bracket 140. Brackets 138, 140 have a horizontal portion and at least one vertical portion, thereby forming a channel in which tubular shaft 136 is received and resides. Brackets 138, 140 may serve as a shelf or further support for tubular shaft 136 between the respective plates, but this is not required.

In at least one alternative embodiment, first apertures 118a, 120a of second and third plates 118, 120 further comprise a collar 142, into which an end of pin 124, 126 is received.

Figure 3:
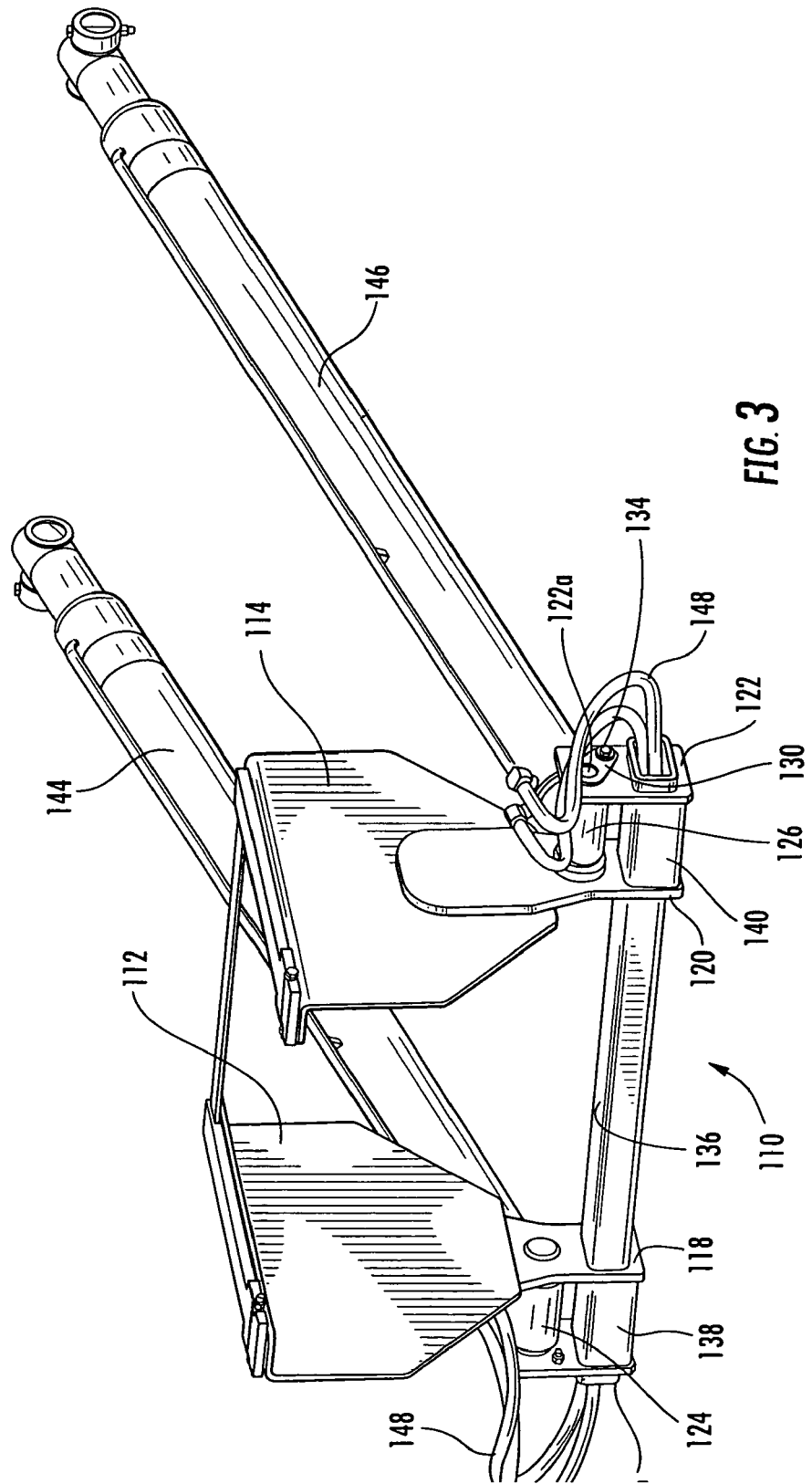
FIG. 3 is a perspective view of the present disclosure.

Also referring to FIG. 3, bottom ends of cylinders 144, 146 are secured to apparatus 110 via pins 124, 126, respectively. One or more hydraulic hoses 148 are routed to or from a hydraulic control, or to or from or between cylinders 144, 146, through tubular shaft 136. This helps to protect hoses 148 which in the prior art may be exposed and vulnerable. In this arrangement, pins 124, 126 are in a double shear arrangement between their respective plates, thus providing a significant strength advantage, and reducing cantilever bending.

Persons skilled in the art will appreciate that apparatus 110 permits the replacement of one or both pins 124, 126 without disrupting the connection between plates 118, 120 and corresponding mounting plates 112, 114. This is accomplished by loosening the corresponding bolt(s) 132, 134, pivoting end plate(s) 128, 130 to reveal existing pin 124, 126, and then removing the pin(s) through the corresponding first aperture. If desired, the cylinder may be removed and replaced. A replacement pin 124, 126 is inserted through first aperture 116a, 122a, through the cylinder, and into first aperture 118a, 120a. The end plate(s) is/are replaced, and the bolt(s) tightened. Specifically, this avoids the time, effort, materials and labor associated with torching, cutting and welding apparatus 110 to mounting plates 112, 114, or replacing a shaft 136 that does not need replacement or even wear at or near the same rate as pins 124, 126.

Thus, the present invention has been described in an illustrative manner. It is to be understood that the terminology that has been used is intended to be in the nature of words of description rather than of limitation. Furthermore, whereas the present invention has been described in relation to the drawings attached hereto, it should be understood that other and further modifications, apart from those shown or suggested herein, may be made within the spirit and scope of this invention.

We claim:

1. A drop shaft comprising:
   first, second, third and fourth vertical and spaced apart plates, said plates substantially in parallel;
   each of said first, second, third and fourth plates defining a first aperture and a second aperture, said second apertures below said first apertures;
   a first pin disposed through said first apertures of said first and second plates, and a second pin disposed through said first apertures of said third and fourth plates;
   a first end plate proximate said first aperture of said first plate and substantially perpendicular to an axis of said first pin, and a second end plate proximate said first aperture of said fourth plate opposite said first endplate and substantially perpendicular to an axis of said second pin; and
   a tubular shaft disposed through said second apertures of said first, second, third and fourth plates.

2. The drop shaft of claim 1 wherein said first and second end plates are pivotably attached to said first and fourth plates, respectively, and wherein said end plates cover at least a portion of said first apertures of said first and fourth plates.

3. The drop shaft of claim 2 wherein said first and second end plates are secured to said first and fourth plates, respectively, using a bolt.

4. The drop shaft of claim 3 wherein said end plates are teardrop shaped.

5. The drop shaft of claim 1 further comprising a first bracket between said first and second plates, and a second bracket between said third and fourth plates.

6. The drop shaft of claim 1 wherein said first apertures of said second and third plates further comprise a collar adapted to receive said pins.

7. The drop shaft of claim 1 wherein said tubular shaft is substantially straight.

8. The drop shaft of claim 1 wherein said first and second pins are essentially coaxial.

* * * * *